Feb. 1, 1944.   J. A. FOTIE   2,340,655
CLUTCH MECHANISM
Filed April 12, 1941   2 Sheets-Sheet 1

INVENTOR.
Joseph A. Fotie
BY
ATTORNEY.

Feb. 1, 1944. J. A. FOTIE 2,340,655
CLUTCH MECHANISM
Filed April 12, 1941 2 Sheets-Sheet 2

INVENTOR.
Joseph A. Fotie
BY Thos. E. Scofield
ATTORNEY.

Patented Feb. 1, 1944

2,340,655

UNITED STATES PATENT OFFICE 2,340,655

CLUTCH MECHANISM

Joseph A. Fotie, Kansas City, Mo.

Application April 12, 1941, Serial No. 388,308

3 Claims. (Cl. 192—24)

This invention relates to improvements in spot welders and refers more particularly to a power drive mechanism for spot welders. In brief, the invention resides in the use of a motor or other suitable power source connected to the reciprocating horn of a spot welder to actuate it automatically instead of manually from the foot treadle.

In the operation of a conventional type of manually operated spot welder, a mechanic is obliged to continually press the treadle or foot pedal of the machine in effecting a spot welding operation. One employed throughout the day or for a long period experiences fatigue and actual pain from the continued use of the leg and foot in pressing down upon the treadle as the force required is considerable, to overcome the effect of spring mechanism required to return the upper pivoted horn to its raised or inoperative position. By the use of a power drive, the operation of the machine is accomplished by pressing down the foot lever and holding it down throughout the welding period. As long as the treadle is kept in a depressed position by the operator, the drive mechanism rocks the upper movable horn and performs the intermittent spot welding operation at a regular and uniform interval.

As suggested, the invention accomplishes a more positive actuation of the welding mechanism. It produces a more uniform interval between the spot welding operations than could be produced by manual operation and reduces to a minimum the fatigue of the operator.

In the accompanying drawings which form part of the instant specification and are to be read in conjunction therewith and in which like reference numerals are used to indicate like parts in the various views.

Figure 2:
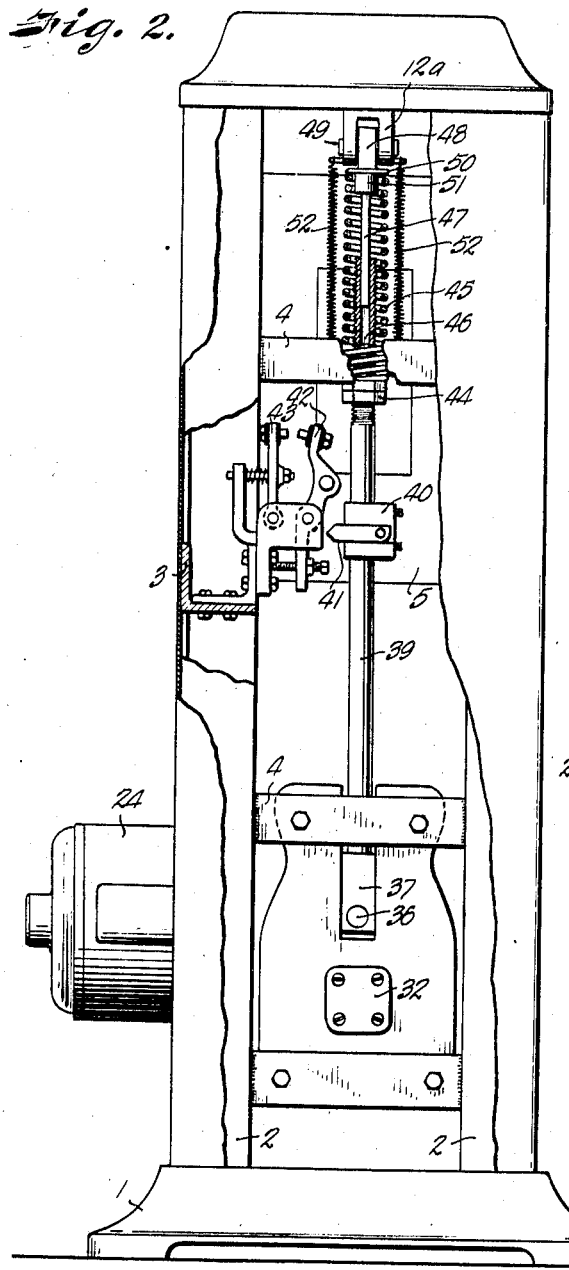
Fig. 2 is a rear view of the spot welder with the rear enclosure broken away.
Figure 3:
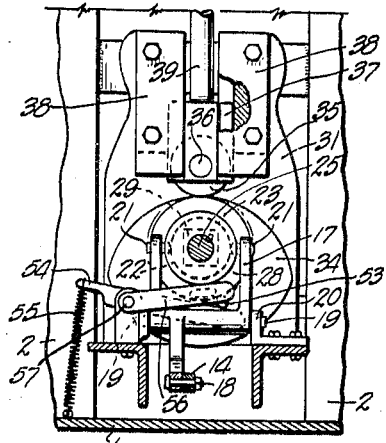
Fig. 3 is a view taken along the line 3—3 in Fig. 1, in the direction of the arrows.
Figure 4:
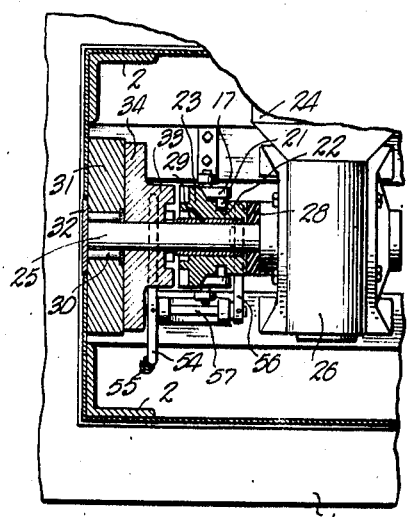
Fig. 4 is a view taken along the line 4—4 in Fig. 1, in the direction of the arrows.

Referring to the drawings, the welder consists of a base 1 upon which is mounted a frame comprising uprights 2, central cross supports 3 and secondary support members 4 which span the upright members and carry the mechanism, hereinafter explained. The uprights and cross members 2 and 3 are angle irons and are welded or otherwise fastened together to form an integral frame. Within the frame is mounted a transformer 5 and upon the front of the frame is mounted a support 6 for the stationary horn 7 and lower electrode 8. Pivoted near the top of the frame on a stub shaft 9 is a support 10 which carries the movable horn 11 and electrode 12'. Extending rearwardly from the pivoted support 10 is an actuating lever 12 which terminates in a bifurcated end 12a, shown in Fig. 2. Also pivoted at the front of the frame but near the bottom upon a shaft 13 is a lever 14, the front end of which has a connection with the treadle 15 so that the latter may be adjusted in any convenient position and swung parallel with the front face of the welder in shipment. The rear extremity of the pivoted lever 14 is fastened to the bell crank end 16 of a pivoted yoke 17 by means of a pin 18. The yoke is supported by shaft extensions 19 in bearing supports 20 as shown in Fig. 3. Near the upper ends of the yoke are pins 21 which extend into a groove 22 formed in the boss of the slidable clutch member 23. A motor 24 is positioned in the lower part of the frame and drives the shaft 25 through a reduction gearing consisting of a worm and worm gear transmission mounted within the casings 26 and 27 respectively. On the shaft 25 is a collar 28 which abuts against the front end of the boss or sleeve of the slidable clutch member when the latter is in disengaged position. The slidable clutch member 23 is bored with a square hole which has slidable engagement with the bar-shaped member 29 also square in cross section and fixedly keyed to the shaft 25, as shown in Fig. 3. The rear end of the shaft 25 rotates in a bearing 30, carried by support 31, as shown in Fig. 4.

A plate 32 covers the rear end of the shaft. Rotatably mounted upon the shaft 25 behind the slidable clutch member 23 is a second clutch member 33, integral with a cam 34, shown in cross section in Fig. 4. Above the cam and in contact therewith is a cam roller 35, which rotates upon a stub shaft 36 in a reciprocating bearing support 37, slidable between the guide plates 38. The bearing support 37 is attached to the lower extremity of a connecting rod 39, which carries a trip mechanism 40 which, by means of projection 41, operates a pivoted contact member 42 with a stationary contact 43 during the spot welding period, the tripping mechanism being conventional with spot welders.

Upon the upper threaded end of the connecting rod 39 is screwed an adjustable collar 44 for abutment of the lower end of the spring 45. The rod is also internally bored as shown at 46, to receive the piston rod 47. The upper end of the piston rod is formed in the shape of an enlarged eye-bolt 48 which fits between the bifurcated portion 12a of the actuating lever 12 and is fastened thereto by means of a pin 49. The upper end of the compression spring 45 abuts against a plate 50 and is held in position by means of an enlarged boss 51 near the top of the piston 47. To return the movable arm to an open position and, at the same time, keep the cam roller 35 in contact with the cam 34, there are attached three tension springs 52 to both sides of the actuating lever 12, the lower ends of these springs being fastened to the cross member 4 near the upper portion of the frame shown in Figs. 1 and 2.

Figure 1:
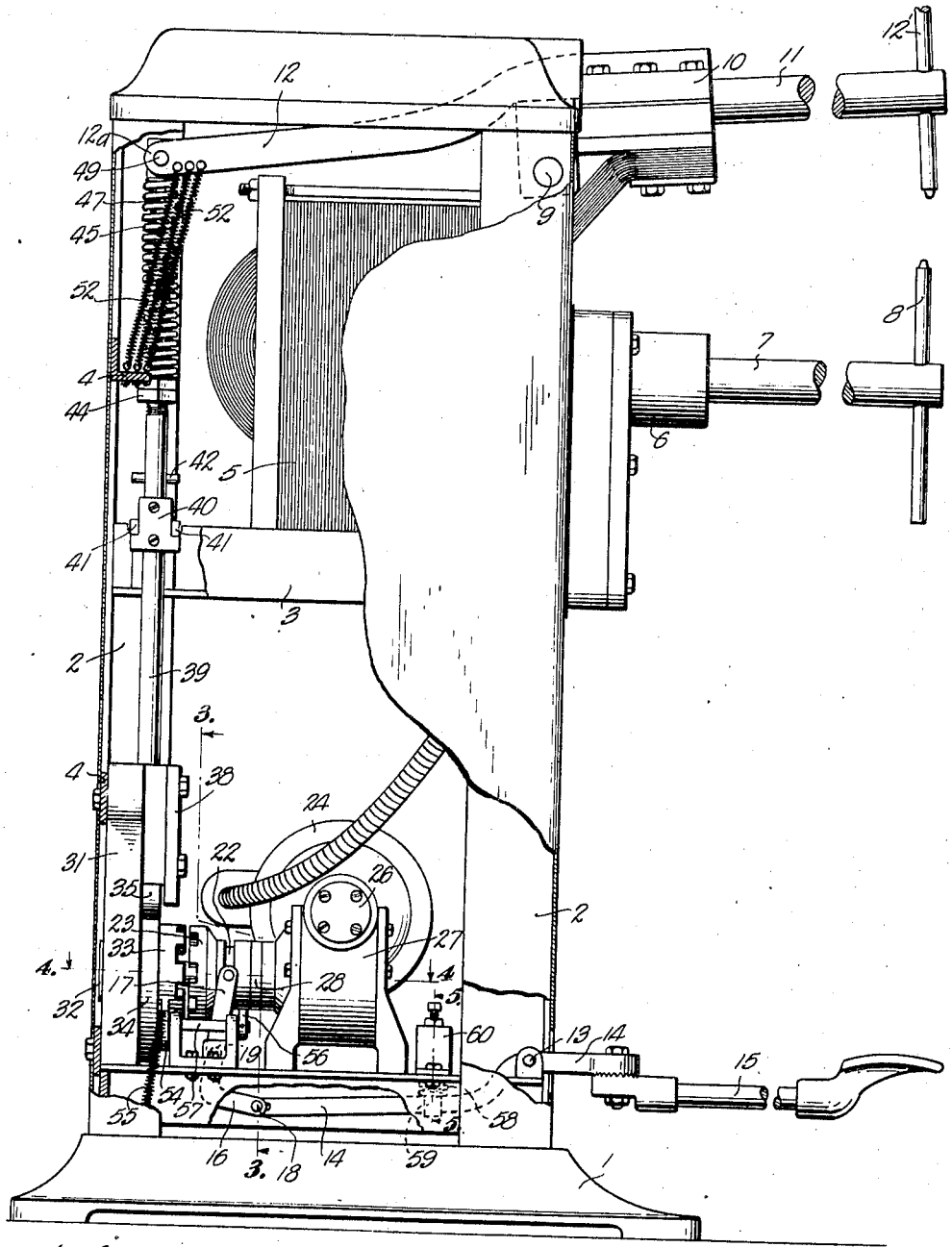
Fig. 1 is a side elevational view of a spot welding machine, with the sides of the casing broken away to expose the power drive.

As it is essential that the power mechanism, or motor, is never disengaged while the upper movable horn and its electrode are in a welding position, a stop mechanism is provided to prevent disengagement of the power drive until the upper movable arm has been raised to a position shown in Fig. 1. This is accomplished by a pin 53 carried by the cam 34 and shown in Fig. 3. The function of this pin contacting the upper surface of a pivoted lever 54 acting against the force of a tension spring 55 is to lower the arm 56 out of the space between the collar 28 and the slidable clutch. The arm 56 is fixedly mounted upon shaft 57 which also carries lever 54, so depression of the lever by means of pin 53 likewise rotates arm 56 on its pivot to a lowered position. In this lowered position, the slidable clutch 23 can be disengaged to the position shown in Fig. 1 where it is in contact with the collar 28. When the pin 53 rotates with the cam away from lever 54 and permits the lever to rise due to the action of the spring 55, the arm 56 is also rotated upon the common pivot 57 of the lever. If the treadle 15, at this time is depressed, to slide the clutch member 23 rearwardly to engagement with clutch member 33, arm 56 will be raised into the space between the hub or boss of the slidable clutch member 23 and the collar 28, thereby preventing disengagement of the clutch until the cam has rotated to a position shown in Fig. 3, where the pin 53 depresses lever 54 and arm 56. By this mechanism, the clutch cannot be disengaged until the movable horn 11 is raised and out of welding position.

Figure 5:
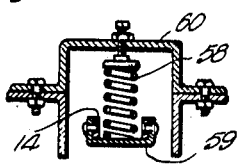
Fig. 5 is an enlarged detail taken along the line 5—5 in Fig. 1, in the direction of the arrows.

In Fig. 5 is shown a compression spring 58, to the bottom of which is attached a shoe 59. The spring is mounted within a casing 60 and serves to return the treadle 15 to a raised position. A locking mechanism, not shown, may be attached to the treadle to maintain it in a depressed position. In the experience of welders and in welding practice, such locking mechanism is not always desirable as it requires tripping by the operator when the power drive is to be disengaged.

In operation, the person operating the spot welder depresses the treadle which, through lever 14, bell crank 16 and yoke 17, slides clutch member 23 into engagement with the clutch member 33. As member 33 is inetgral with cam 34, the cam is rotated and connecting rod 39 is reciprocated by the action of the cam roller 35, mounted on the lower extremity thereof. Reciprocation of the connecting rod through the buffer spring arrangement at the top of the rod rocks the horn 11 upon pivot 9 through actuating lever 12 to a welding position where electrodes 8 and 12' are in close enough proximity so that the current passes. At this time, trip projection 41 moves contacts 42 and 43 together. As long as the treadle 15 is depressed, actuation of the movable horn 11 is accomplished through the automatic drive, with power supplied from the motor 24. If the treadle 15 is released or permitted to raise by the operator, spring 58 shown in Fig. 5 will depress lever 14 rearwardly of its pivot 13 and slide the clutch member 23 from engagement with clutch member 33. This disengagement of the clutch members is permitted only when the arm 11 is out of welding position, due to the action of pin 53, rotating with cam 34 and acting against lever 54 to depress arm 56 out of the space between the clutch 23 and collar 28.

Besides serving as an abutment for the spring, the adjustable nut 44 and the lock nut directly thereabove also act as an adjustment for the contact pressure imposed in the welding operation upon the electrodes 8 and 12'. In other words, by adjustment of the nut 44 and the compressive force of the spring 45, contact pressure between the electrodes imposed during the spot welding operation may be accurately controlled.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A device comprising a motor driven shaft, a cam rotatably mounted on the shaft, a clutch member movable with said cam, a second clutch member slidably but non-rotatably mounted on the shaft, a treadle, operative connections between the treadle and second clutch member to move the latter into and out of engagement with said first clutch member, and a stop mechanism operative to hold the first and second clutch members in engagement, the mechanism being operated to a released position by the cam at a predetermined point in its rotation whereby the treadle may be operated to disengage the clutch members only when the cam is in a position to operate the stop mechanism.

2. In a welding machine a reciprocating rod, a driven means for reciprocating said rod, a power operated mechanism, clutch means for engaging and disengaging the power mechanism and the driven means, a treadle cooperative with the said clutch means for manually engaging and disengaging the power mechanism with the driven means, and a stop mechanism operative to hold the clutch means in a position to engage the power mechanism with the driven means, said stop mechanism being intermittently actuated by the driven means to a clutch releasing position, whereby the treadle may only be operated to release the clutch means when the stop mechanism is actuated by the said driven means.

3. In a welding machine having a driven means including a clutch member, a power operated mechanism, a second clutch member movable axially into and out of engagement with the first clutch member for connecting the power mechanism and driven means, and a clutch operating means, the improvement comprising a pivot rod arranged parallel to the clutch axis, an arm mounted on the rod extending transversely of the movable second clutch member and operative to move transversely behind its rear face when said clutch members are engaged to prevent disengagement thereof, means urging the arm to the clutch engaging position, and means operated by the driven means to intermittently actuate the arm to a clutch releasing position.

JOSEPH A. FOTIE.